Feb. 25, 1969  R. K. JONES  3,429,507

RAINMAKER

Filed July 25, 1966

INVENTOR.
ROBERT K. JONES
BY
Townsend and Townsend
ATTORNEYS

United States Patent Office
3,429,507
Patented Feb. 25, 1969

3,429,507
RAINMAKER
Robert K. Jones, 1710 Lilac Drive,
Walnut Creek, Calif. 94529
Filed July 25, 1966, Ser. No. 567,510
U.S. Cl. 239—2      8 Claims
Int. Cl. A01g 15/50; B64d 1/18

ABSTRACT OF THE DISCLOSURE

Apparatus including a large venturi passage carried by an airborne device for impelling moisture laden atmosphere at high velocity therethrough to produce a large volume seeding area for inducing atmospheric precipitation. Supporting mechanisms for the artificial cooling of the impelled atmosphere and for the injection therein of catalytic condensation inducing particles is provided.

---

This invention comprises a device and process for the production of rain.

In the present invention a large venturi passage carried by an airborne device such as a dirigible, conventional airplane, or lighter than air balloon has moisture-laden atmosphere impelled at high velocity through its length. Condensation is precipitated in the passing air by temporary reduction in pressure and temperature occurring at and after the constriction of the passage. Further, proximate to the constriction of the venturi, artificial cooling means of relatively high intensity injected into the large volumes of passing atmosphere creates a substantial temperature reduction below ambient. Additionally, a plurality of catalytic condensation inducing particles, such as Dry Ice, silver iodide crystals, electrically charged sand particles and the like, are injected into the passing atmosphere. The atmosphere, excited as described, and discharged from the venturi, accumulates or aggregates in a large volume seeding area which is capable of inducing precipitation in surrounding untreated atmosphere more efficiently and effectively than heretofore known.

An object of this invention is to emulate nature in producing rainfall by reducing atmospheric pressure and temperature below ambient and thus to detract from the affinity of said atmosphere for its contained moisture.

A further object is to utilize a device and process which induces precipitation in clouds of low moisture content which heretofore have been unaffected by rainmaking machines.

An advantage of this invention is that the condensation inducing phenomena of a venturi acting on large volumes of passing air can be used in combination or independently with either artificial atmospheric cooling below ambient, the introduction of catalytic rain-inducing particles, or both.

An additional advantage is that the volume of air treated to induce rain creates a large seeding area which correspondingly magnifies the probabilities of inducing precipitation.

Other objects, features and advantages of the present invention will become more apparent after referring to the following specification and attached drawings in which.

Figure 1:
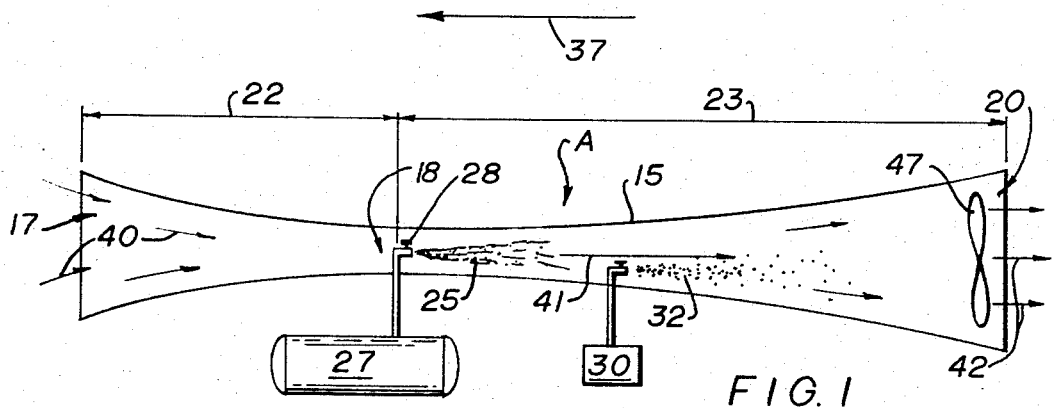
FIG. 1 is a schematic diagram of the principal embodiment of the invention.

With reference to FIG. 1, large venturi passage A is formed by air retaining wall 15 defining opening 17 at one extremity, medially located constriction 18 and exhaust 20 at the other extremity. Venturi passage A is shown concentric and circular in converging area 22 and diverging area 23. Fluid coolant 25 is entered proximate to constriction 18. Coolant 25 is stored in a liquefied state in container 27 and expanded through valve 28 in the interior of venturi A. Between constriction 18 and exhaust 20, catalyst injector 30, capable of placing a plurality of condensation-inducing catalytic particles 32 in passage A, is located. The catalytic particles used may include Dry Ice, electrically charged sand particles, silver iodide crystals and the like.

In operation, venturi passage A is rapidly moved through moisture-laden atmosphere in the direction of movement arrow 37. The atmosphere is confined by opening 17 and moves in the interior of the venturi in the direction of flow arrows 40, 41 and 42. The atmosphere is accelerated relative to the passage by converging area 22 and reaches a maximum velocity in the confines of constriction 18 as indicated by elongate flow arrow 41. The atmosphere then traverses the remainder of venturi-shaped passage A, decelerating in diverging area 23. The rapid flow of the atmosphere in the area of constriction 18, temporarily reduces the atmospheric pressure in accordance with Bernoulli's principle. This pressure reduction and its corresponding reduction in temperature reduces the affinity of the atmosphere for its contained moisture and droplets of water or ice form.

In addition to the aforementioned pressure and temperature reduction, coolant 25 further causes precipitation in the confined atmosphere. Coolant 25 originally in a liquefied form in container 27 is introduced proximate to constriction 18 by valve 28. After passing valve 28, coolant 25 rapidly expands, drops in temperature and intermixes with the passing atmosphere in diverging area 23. This intermixture lowers the temperature of the exhausted atmosphere, further decreasing the affinity of the atmosphere for its contained moisture.

Condensation-inducing catalytic particles 32 further detract from the affinity of the atmosphere for its contained moisture when added in diverging area 23. Catalytic particles 32 are placed in the passing atmosphere by catalyst injector 30 and commence their action upon the atmosphere still in venturi passage A. This greatly multiplies the catalytic effect of the particles and induces precipitation in larger amounts.

As can readily be observed from the foregoing description, the atmosphere need only be treated to the extent necessary to induce rain. If the balance of moisture suspended with the air is so delicate that the mere flow of atmosphere through venturi passage A is all that is required to induce precipitation, no liquid gases or silver iodide crystals need be added. In the alternative, when mere passage of the atmosphere through the restriction fails to generate the desired precipitation, then coolant, catalytic particles or both may be added to excite the passing atmosphere.

It is essential to the practice of this invention that at least 1,000 cubic feet of moisture-laden air at ambient temperature be treated. In actual application, the cross-sectional area of opening 17 taken about a plane normal to the axis of venturi passage A is approximately 20 square feet. Constriction 18 has approximately $\frac{1}{16}$ the area of opening 17. The cross-sectional area of exhaust 20 is approximately one half that of opening 17. It is contemplated that the overall length of the venturi passage A will be four times the diameter of opening 11, or about 20 feet.

Although variations may be made in the above described dimensions without departing from the spirit and scope of this invention, such alteration should be capable of forming a venturi passage capable of exciting large volumes of moisture-laden atmosphere. For purposes of illustration, the venturi passage here shown has been concentric and circular in converging area 22 and diverging area 23. It should be understood that this venturi shape may be altered to meet the mounting configuration requirements of any embodiment of this invention.

It may be deemed desirable to maintain venturi-shaped passage A in a stationary position adjacent to a cloud formation in which precipitation is desired. In such an application the air flow is created by impeller 47 shown located in the exhaust in FIG. 1. As is apparent, impeller 47 can be located at other locations convenient to the mounting configuration of venturi passage A.

One convenient means for the carrying of the large venturi passage A is by mounting the passage in the center of a dirigible 50. Opening 17 appears at the front, exhaust 20 in the tail or after-section of the aircraft, and constriction 18 is located between said opening and said exhaust. Dirigible impeller 52 is located at the constriction 18 and forces atmosphere through the venturi passage A in the direction of flow arrows 40, 41 and 42. Reversible propeller 53 is attached to the exterior of dirigible 50 so that the aircraft can be held in a stationary position relative to a moisture-laden cloud formation in which a large seeding area is desired to be produced.

Figure 2:
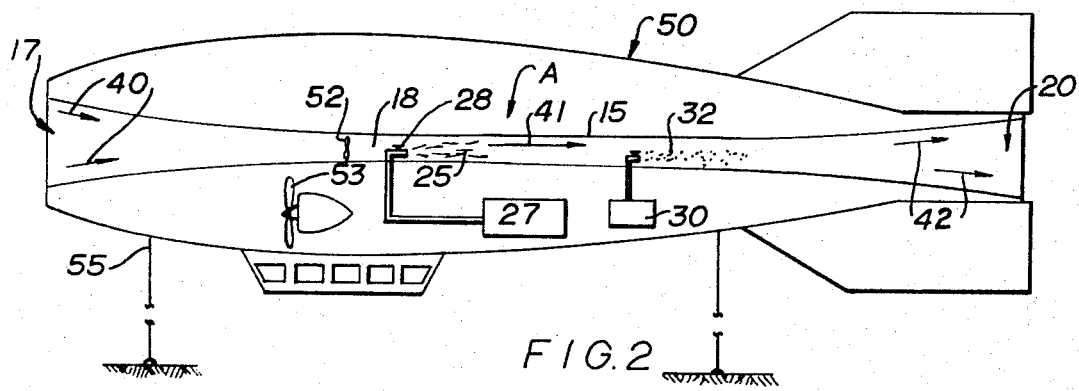
FIG. 2 is a schematic cross section of a dirigible aircraft having the invention installed within.

The present invention can also be adapted to operate attached to a balloon similar in configuration to dirigible 50, and can be held in a stationary position by ground-attached cables 55 as illustrated in FIG. 2.

Figure 3:
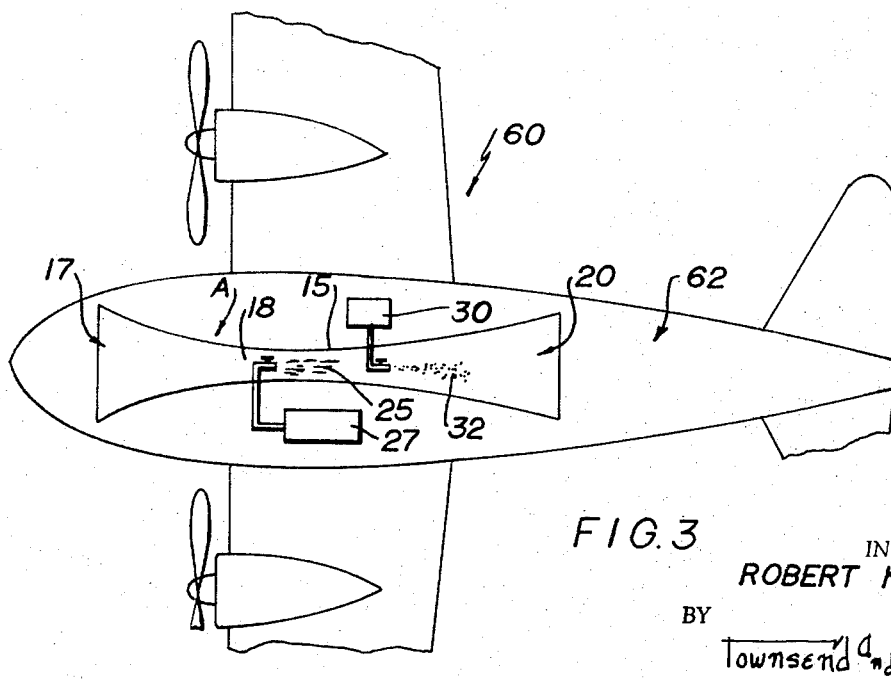
FIG. 3 is a schematic cross section of a conventional airplane with the invention installed within.

FIG. 3 shows an alternate embodiment of this invention in conventional airplane 60. Airplane fuselage 62 has been modified to contain venturi passage A. Airplane 60 is propelled through the atmosphere at a velocity necessary to effect the desired flow of air through the venturi passage. Similar to dirigible 50, coolant 25 and condensation-inducing catalytic particles 32 are introduced in the interior of the passage.

While several embodiments of this invention have been shown and described, it will be apparent that other adaptations and modifications of this processing device can be made without departing from the true scope of the invention described thus far.

What is claimed is:

1. An apparatus for inducing precipitation comprising: an air retaining wall defining a passage; said passage having an opening, a constriction and an exhaust and having converging areas on successive planes taken normal to the axis of said passage from said opening to said constriction and diverging areas on successive planes taken normal to said axis from said constriction to said exhaust; and opening having a cross-sectional area normal to the said axis of at least twenty square feet; means supporting said wall means in the atmosphere in a stationary position, said supporting means comprising an airborne device; means to force air through said passage from said opening to said exhaust to establish an air flow stream of high velocity at said constriction, said forcing means mounted within said passage; a fluid coolant; means introducing said coolant through said wall means into the high velocity air flow stream at said constriction whereby the air is cooled both by the air flow and the coolant as it passes through the passage.

2. An apparatus for inducing precipitation according to claim 1 having: a plurality of catalytic condensation-inducing particles; means for introducing said catalytic rain-inducing particles proximate said diverging area through said wall means to intermix with said cooled atmosphere.

3. An apparatus for inducing precipitation comprising: an air retaining wall defining a passage; said passage having an opening, a constriction and an exhaust and having converging areas on successive planes taken normal to the axis of said passage from said opening to said constriction and diverging areas on successive planes taken normal to the axis of said passage from said opening to said constriction and diverging areas on successive planes taken normal to said axis from said constriction to said exhaust; means supporting said wall means in the atmosphere in a stationary position, said supporting means comprising an airborne device; means to force air through said passage from said opening to said exhaust to establish an air flow stream of high velocity proximate said constriction; said forcing means mounted within said passage; a fluid coolant; means introducing said coolant through said wall means into a high velocity air flow stream at said constriction whereby the air is cooled both by the air flow and the coolant; condensation-inducing catalytic particles; means for introducing said particles into said high velocity flow stream proximate to said diverging area.

4. An apparatus for inducing precipitation according to claim 3 and wherein said means to force air comprises an impeller mounted within said passage adjacent said wall positioned to direct the air flow stream through said passage.

5. An apparatus for inducing precipitation according to claim 3 and wherein said means to force air comprises an aircraft with said wall means being mounted to said aircraft; means to move said aircraft through the air and said wall means being positioned with said opening facing the direction of travel of the aircraft.

6. A process for inducing precipitation in moisture-laden air having the steps of: providing apparatus having a converging spacial area and a diverging spacial area; transporting and maintaining said apparatus in a stationary position adjoining a moisture-laden air formation; moving at least one thousand cubic feet of moisture-laden air of said moisture-laden cloud formation at ambient pressure and temperature through said device at said converging spacial area, thence through said diverging spacial area whereby a high velocity flow stream is obtained at the junction of said converging spacial area and said diverging spacial area; injecting a fluid coolant into said high velocity flow stream whereby said air is cooled substantially below ambient; and thence discharging said air into said surrounding moisture-laden cloud formation.

7. A process for inducing precipitation in moisture-laden air according to claim 6 having the additional step of: injecting catalytic moisture-inducing particles into the high velocity flow stream to cause the particles to exert their catalytic effect under conditions of low temperature and pressure.

8. An apparatus for inducing precipitation according to claim 4 and wherein: means mounted to said airborne device to oppose the thrust of said forcing means for maintaining said airborne device stationary with respect to a cloud formation whereby a large volume seeding area is produced within a given cloud formation.

References Cited

UNITED STATES PATENTS

| 1,957,075 | 5/1934 | Morgensen | 244—136 |
| 2,048,847 | 7/1936 | Desmet | 244—136 |
| 3,301,485 | 1/1967 | Tropeano et al. | 239—2 |

FOREIGN PATENTS

| 1,372,024 | 8/1964 | France. |
| 10,046 | 12/1924 | India. |
| 488,038 | 12/1953 | Italy. |

EVERETT W. KIRBY, *Primary Examiner.*

U.S. Cl. X.R.

169—2; 239—14, 171; 244—136